Figure 3:
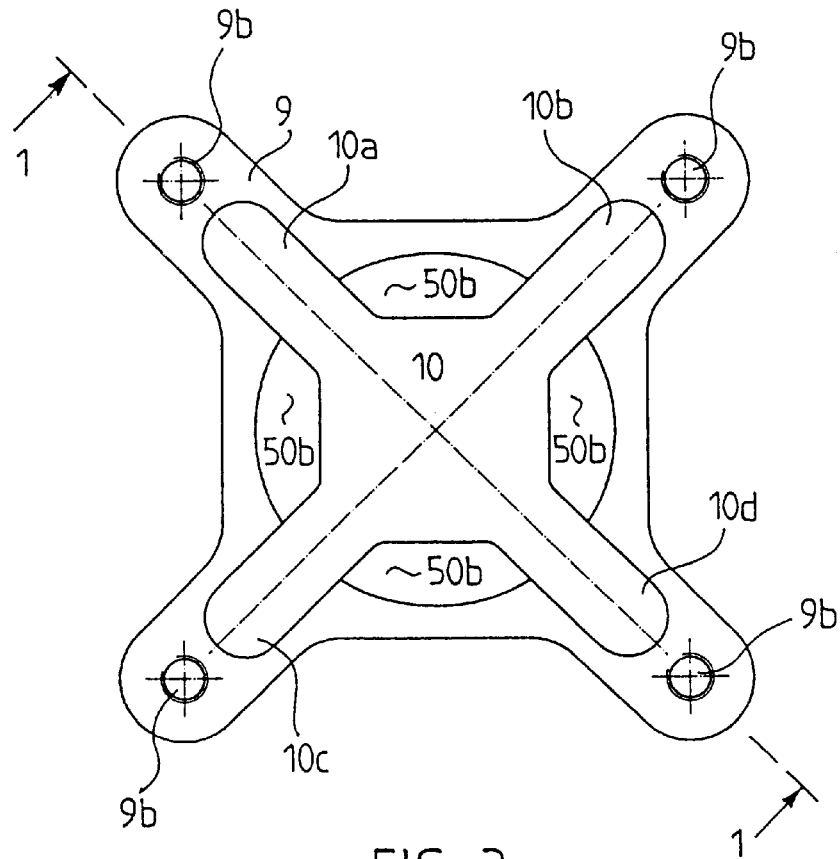

United States Patent
Koivisto

[11] Patent Number: 6,085,605
[45] Date of Patent: Jul. 11, 2000

[54] ACTUATOR FOR LINEAR MOVEMENT

[75] Inventor: Aulis Koivisto, Oulu, Finland

[73] Assignee: Nokia Telecommunications Oy, Finland

[21] Appl. No.: 08/973,212

[22] PCT Filed: Jun. 5, 1996

[86] PCT No.: PCT/FI96/00335

§ 371 Date: Dec. 4, 1997

§ 102(e) Date: Dec. 4, 1997

[87] PCT Pub. No.: WO96/39590

PCT Pub. Date: Dec. 12, 1996

[30] Foreign Application Priority Data

Jun. 5, 1995 [FI] Finland ..................... 952741

[51] Int. Cl.[7] .................. H03J 3/00; F16H 27/02
[52] U.S. Cl. ........................... 74/89.15; 334/20
[58] Field of Search .............. 74/424.8 R, 89.15; 333/202, 174; 334/20

[56] References Cited

U.S. PATENT DOCUMENTS

| | | |
|---|---|---|
| 2,476,584 | 7/1949 | Clark . |
| 2,481,129 | 9/1949 | Tourneau . |
| 2,690,682 | 10/1954 | Passman . |
| 3,008,340 | 11/1961 | Chillson . |
| 3,377,878 | 4/1968 | Maroth . |
| 3,715,690 | 2/1973 | Young et al. ............... 333/202 X |
| 4,179,944 | 12/1979 | Conner . |
| 4,246,991 | 1/1981 | Oldakowshi . |
| 4,497,215 | 2/1985 | Gronbech et al. . |
| 4,772,849 | 9/1988 | Tedder .................. 74/89.15 X |

FOREIGN PATENT DOCUMENTS

| | | |
|---|---|---|
| 649 357 | 5/1985 | Switzerland . |
| 655 768 | 5/1986 | Switzerland . |
| 1336-587-A | 4/1986 | U.S.S.R. ............... 74/89.15 |
| 89/01579 | 2/1989 | WIPO . |

*Primary Examiner*—David A. Bucci
*Assistant Examiner*—Colby Hansen
*Attorney, Agent, or Firm*—Pillsbury Madison & Sutro LLP

[57] ABSTRACT

An actuator for creating linear movement is provided. The actuator includes a motor having a rotatable motor axle. As the rotatable motor axle rotates, it uses internal threads to transfer rotational motion to external threads of a movement axle. By transferring the rotational motion of motor axle to the movement axle, the motor's rotating movement is changed into linear movement. This linear movement can then used for moving a frequency control element such as those used in filters, which are in-turn used in the base station of a cellular radio network.

16 Claims, 3 Drawing Sheets

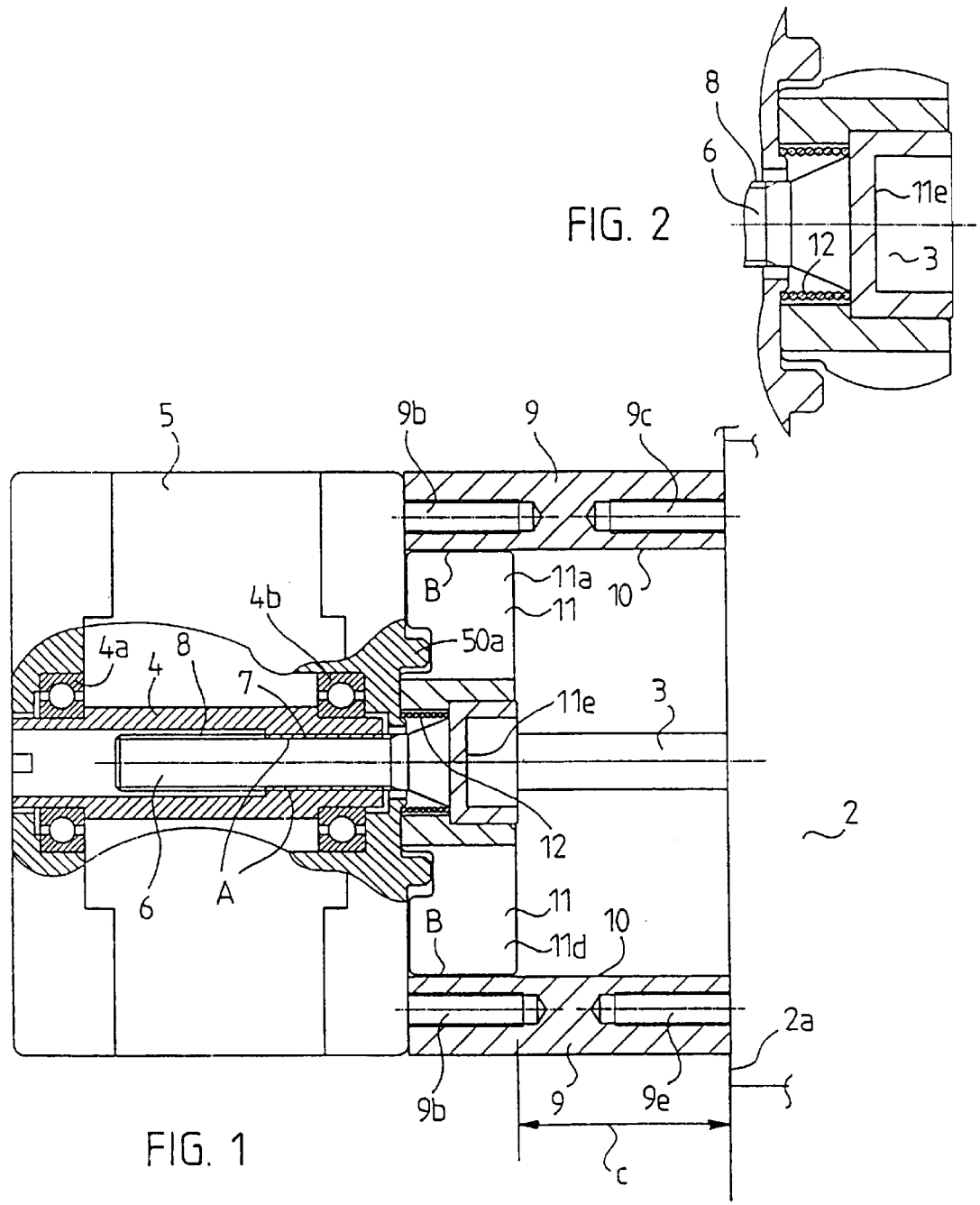

ACTUATOR FOR LINEAR MOVEMENT

This application is the national phase of international application PCT/FI96/00335 filed Jun. 5, 1996 which designated the U.S.

The present invention relates to an actuator for linear movement comprising a motor provided with a rotatable motor axle, a movement axle, a thread transmission between the motor axle and the movement axle, a supporting frame, a controlling support between the supporting frame and the movement axle for changing the rotating movement of the motor axle into a linear movement of the movement axle, and further, a clearance removing means for removing clearance in the axial direction, the actuator for linear movement being such that the thread transmission between the motor axle and the movement axle comprises an internal thread in the motor axle and an external thread in the movement axle.

The present actuator for linear movement can be used for moving a frequency control element especially in a filter, such as a combiner filter, used in a base station of a cellular radio network. Actuators for linear movement use an electrically driven stepping motor whose rotating movement is changed into a linear movement. The changing of the rotating movement into a linear movement is a result of the movement axle being supported on a supporting frame, that is, in practice, on a mounting flange of the motor, whereupon the rotating movement of the motor axle changes into a linear movement of the movement axle because the movement axle is not able to rotate.

In prior art solutions there is an external thread in the motor axle and an internal thread in the movement axle. A so-called square axle is used as a movement axle in prior art solutions, the axle being quadrangular at its external surfaces and supported on the square-shaped opening in the supporting frame. The square axle comprises an internal thread inside it against which the external thread of the motor axle is settled. This construction is poor for the support of the movement axle as the supporting surfaces of the movement axle, that is, the overlapping portion of the threads and, on the other hand, the supporting point of the movement axle are more or less on top of each other, whereby there is no distance between the supporting surfaces when viewed in the axial direction. In this construction the support of the movement axle will be inadequate and it causes clearance which impairs the properties of the construction. One disadvantage is also that the construction will be long in the axial direction, that is, great in size. In prior art solutions clearance is removed by using only an axial spring which, when stressed in the axial direction, removes clearance only in the axial direction.

In other solutions, that is, mainly in heavy transfer operations, it is known to use such actuators for linear movement that have a different thread transmission, that is, a thread transmission in which there is an internal thread in the motor axle and an external thread in the movement axle. Such solutions are disclosed e.g. in U.S. Pat. Nos. 2,476,584, 3,008,340, 3,377,878, 2,471,129, 4,497,215 and CH-649, 357. The references cited and also other prior art solutions have a problem in that the removal of clearance of the movement axle remains inadequate. This problem is emphasized in one special application of the invention, that is, in transfer of a light frequency control element, because clearance causes a control error.

The object of the present invention is to introduce a new kind of actuator for linear movement that will obviate the problems associated with prior art solutions.

The object is attained with a solution according to the invention that is characterized in that the actuator for linear movement comprises a means for removing vertical, horizontal and rotary clearances.

Several advantages are attained with the actuator for linear movement according to the invention. The actuator for linear movement according to the invention is such that a very accurate operation is achieved with it because the vertical, horizontal and rotary clearances of the movement axle are also removed in addition to ordinary removal of clearance, that is, removal of clearance in the axial direction. The solution according to the invention makes it possible that clearance tolerances of the structures can be greater and because of this, the structures can be produced with less costs. The invention is applied to moving very light frequency control elements, whereupon the actuator for linear movement according to the invention is in practice almost without clearance with these fairly small loads. More accurate frequency control is attained by the minimization of clearances. The solution according to the invention is also smaller in size than prior art solutions. The actuator for linear movement according to the invention will be such that the support of the movement axle is therein considerably better as the solution according to the invention minimizes clearances efficiently by providing a long distance in the axial direction between the supporting surfaces of the movement axle.

Figure 4:
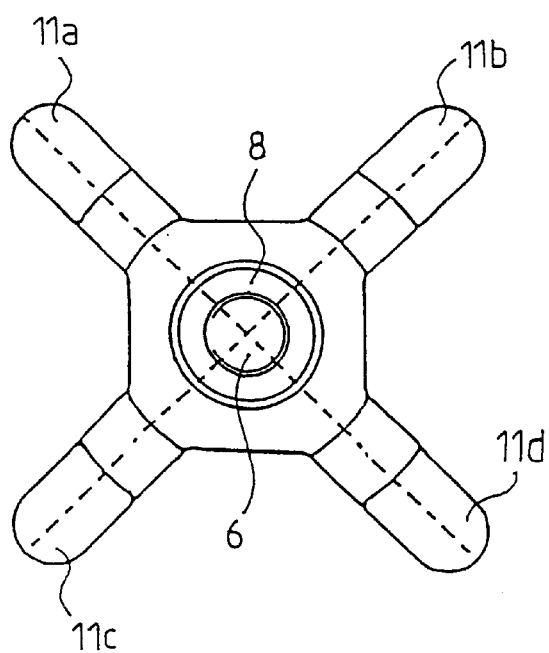
Figure 5:
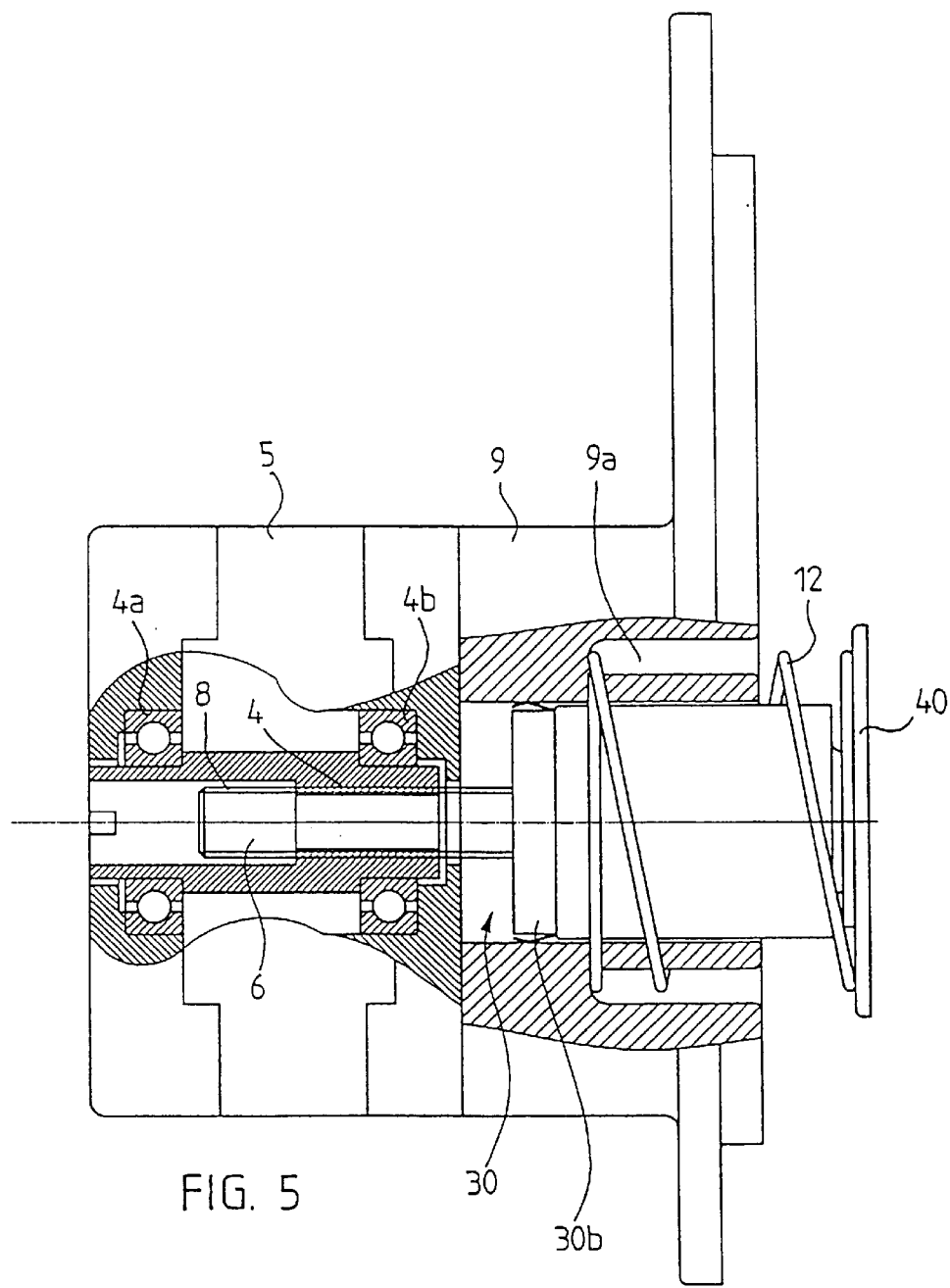
Figure 6:
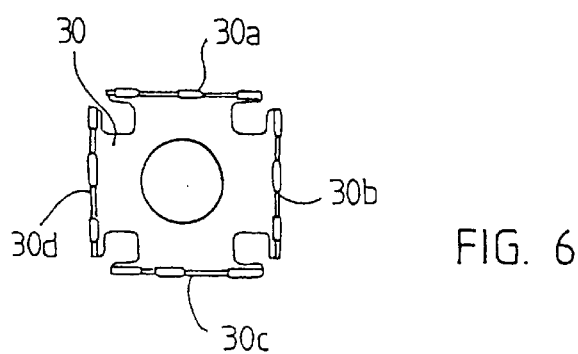

In the following, the invention will be explained in more detail with reference to the accompanying drawings, in which FIG. 1 illustrates a first embodiment of the invention, FIG. 2 illustrates a detail of FIG. 1, FIG. 3 illustrates the supporting frame used in the first embodiment of the invention, viewed in the direction of the motor, FIG. 4 illustrates the movement axle used in the first embodiment of the invention, viewed in the direction of the motor, FIG. 5 illustrates a second embodiment of the invention, and FIG. 6 illustrates a spring means used in the second embodiment of the invention.

Referring to FIGS. 1 to 4, the invention relates to an actuator for linear movement 1 used for moving a frequency control element 3, for example, in a filter 2, such as a combiner filter 2 of a base station of a cellular radio network.

The actuator for linear movement 1 comprises an electric motor 5 provided with a rotatable motor axle 4, a movement axle 6 and a thread transmission 7, 8 between the motor axle 4 and the movement axle 6. The electric motor 5 is a stepping motor and it comprises bearings 4a and 4b on which the motor axle rotates. Furthermore, the actuator for linear movement 1 comprises a supporting frame 9, a controlling support 10 and 11 between the supporting frame 9 and the movement axle 6 for changing a rotating movement of the motor axle 4 into a linear movement of the movement axle 6. The actuator also comprises a clearance removal means 12 for removing clearance in the axial direction. The clearance removal means 12 is prestressed in the axial direction, that is, it is a compressed coil spring. In FIGS. 1 to 2 the spring is presented wholly compressed as the motor 5 has drawn the movement axle 6 into the rearmost possible position, that is, near the motor 5.

The controlling support thus comprises structures 10 and 11 of which the structure 10 is formed of a space 10, 10a to 10d in the supporting frame 9, that is, in the control flange, that is, in the control piece, and the structure 11 is formed of projections 11a to 11d in the movement axle 6. The movement axle 6 thus comprises an actual axle 6 and its threads 8 and also, parts 11a to 11d which form part of the controlling support. The movement axle 6 further comprises a mounting place 11e to which the frequency control element 3 is mounted. The structure of the movement axle 6 can be best seen in FIGS. 1 and 4. The structure of the supporting frame provided with recesses 10a to 10d can be best seen in FIGS. 1 and 3. It is noted in this connection that the cross section of FIG. 1 is 45 degrees inclined, that is, between arrows 1—1 in FIG. 3. The supporting frame 9, that is, the control flange 9 controls the movement of the linear movement axle 6 and acts as a mounting frame for the motor 5 and also as a means for mounting the whole actuator for linear movement in connection with the application. The supporting frame 9, that is, the control flange 9 comprises thread elements or corresponding mounting elements 9b and 9c. The threads 9b are used when the motor 5 is mounted to the supporting frame 9, that is, to the control flange with mounting elements, such as bolts (not shown), from the direction of the motor 2. The threads 9c are used when the whole actuator for linear movement is mounted to a wall 2a of the filter 2 with mounting elements, such as bolts (not shown), from the direction of the filter 2.

The actuator for linear movement 1 is characterized in that the thread transmission between the motor axle 4 and the movement axle 6 comprises an internal thread 7 in the motor axle and an external axle 8 in the movement axle 6. The motor axle 4 is thus inside the motor and it comprises the internal thread 7 which, when it rotates, makes the movement axle 6 to move linearly in accordance with arrow C, the direction of movement being dependent on the rotating direction of the motor S.

In the actuator for linear movement 1 the thread transmission 7 to 8 between the motor axle 4 and the movement axle 6 forms a first supporting surface A of the movement axle 6, and the controlling support 10 to 11 between the supporting frame 9 and the movement axle 6 forms a second supporting surface B of the movement axle 6. In a preferred embodiment, the supporting surfaces A and B are, when viewed in the axial direction, clearly at a distance from one another in such a manner that the first supporting surface A is in the area inside the motor 5 and the second supporting surface B is in the area outside the motor 5, that is, where the projections 11a to 11d of the movement axle 6 are supported to the edges of the recesses 10a to 10d of the supporting frame 9. Then the support of the movement axle 6 is very steady.

In the actuator of one preferred embodiment of the invention the controlling support 10 to 11 comprises several projections 11a to 11d in the movement axle 6, the projections extending away from the middle line of the movement axle 6, and as counterparts for the projections 11a to 11d, the controlling support 10 to 11 comprises recesses 10a to 10d formed in the supporting frame 9, the recesses extending similarly away from the middle line of the movement axle 6. By means of the projections 11a to 11d extending to the side from the middle line and the recesses 10a to 10d of the supporting frame 9 as counterparts, the movement support of the movement axle 6 will improve and this provides the advantage that the construction tolerances of the structures may be greater, whereupon the construction of the structures is easier and less expensive.

In the actuator of one preferred embodiment of the invention the projections 11a to 11d in the movement axle 6 and also, the recesses 10a to 10d in the supporting frame 9 are situated symmetrically and at equal distances around the movement axle 6. Then the support is also balanced. There are preferably at least four projections 11a to 11d and also, four recesses 10a to 10d, whereby the support and the removal of clearance are good enough. In one preferred embodiment, the projections 11a to 11d and most preferably also the recesses 10a to 10d comprise a curved edge and on account of this edge, the movement in the linear direction occurs with as little friction as possible.

In the actuator of one very preferred embodiment of the invention the clearance removal means 12 for removing clearance in the axial direction is prestressed also in the direction of rotation for removing vertical, horizontal and rotary clearance. Then the clearance removal means 12 rotates the movement axle 6 within the confines allowed by the clearance in such a manner that the projections 11a to 1d in the movement axle 6 press against walls 10a to 10d of the recesses in the supporting frame 9, whereupon the clearances will be removed. This embodiment removes clearances and employs efficiently the same spring means 12 by means of which axial clearance is also removed. It is also possible to use two separate means, that is, one means which is prestressed in the axial direction and the other means which is prestressed in the direction of rotation, but the Applicant has observed that the version of one assembly is better.

Relating to the aforementioned, the actuator in a preferred embodiment comprises adjusting means for prestressing the clearance removal means 12 in the direction of rotation to desired prestressing, and these means comprise the projections 11a to 11d and the recesses 10a to 10d in the controlling support 10 to 11. The adjusting means thus comprise the projections 11a to 11d of the movement axle 6 and the recesses 10a to 10d of the supporting frame 9, whereupon this embodiment provides the projections 11a to 11d and the recesses 10a to 10d with yet another additional use, and this reduces the number of required structural parts and lowers the expenses. It could be mentioned as an example that when assembling the actuator for linear movement 1, prestressing in the direction of rotation for the spring 12 can be carried out in such a manner that when in a starting situation the movement axle 6 and its projections are separate parts, it is first made sure that the rear part of the spring 12 is fixed to the side of the motor 5 in the frame of the motor, for example, and that the outer end of the spring 12 is fixed to the juncture of the axle part 6 of the movement axle and the projections 11a to 11d. Next the movement axle 6 and its projections 11a to 11d are rotated half a revolution by hand, for example, whereupon the spring 12 acquires prestressing in the direction of rotation, after which the movement axle 6 and its projections 11a to 11d are pushed inside the supporting frame 9, whereupon the projections 11a to 11d enter the recesses 10a to 10d and the movement axle 6 meets the motor axle 4. In order that the movement axle 6 would be fixed to the assembly, the motor axle is at the end rotated to some extent, whereupon the internal thread 7 of the motor axle 4 draws the movement axle 6 towards the motor by means of the thread part 8 of the movement axle 6.

In a preferred embodiment connected to the assembly or operation of the actuator for linear movement especially according to FIGS. 1 and 3, the actuator preferably comprises a supporting frame, that is, a centring structure 50a, 50b between the control flange 9 and the motor 5, the structure most preferably comprising in the motor 5 a centring part 50a, such as a projection 50a in FIG. 1, and in the supporting frame 9 a counterpart 50b, such as a recess 50b in FIG. 3. The projection 50a and the recess 50b are round.

In the actuator for linear movement of one preferred embodiment of the invention the projections 11a to 11d in the movement axle 6 are non-magnetic material, most preferably plastic material. Then the movement axle 6 and its projections 11a to 11d do not disturb the electric operation of the filter 2 and also, this provides the advantage that the movement axle 6 slides well along the recesses 10a to 10d in the supporting frame 9. In addition, a good durability is attained.

In the actuator for linear movement of one preferred embodiment of the invention the clearance removal means 12, that is, the spring 12 is at least primarily within the area confined by the supporting frame 9. In that case, the spring 12, which is most preferably a metallic spring for the sake of durability, cannot disturb the electric operation of the filter 2. The spring would settle at least primarily inside the supporting frame 9 even though the movement axle 6 were moved to its other extreme position for the distance C.

FIGS. 5 to 6 relate to a second embodiment of the invention. As in the first embodiment of FIGS. 1 to 4, the actuator for linear movement of the second embodiment also comprises an electric motor 5 provided with a rotatable motor axle 4, a movement axle 6 and a thread transmission 7, 8 between the motor axle 4 and the movement axle 6. The electric motor 5 is a stepping motor and it comprises bearings 4a and 4b on which the motor axle 4 rotates. Furthermore, the actuator for linear movement 1 comprises a supporting frame 9, that is, a control piece, that is, a control flange, a controlling support 10 and 11 between the supporting frame 9 and the movement axle 6 for changing the rotating movement of the motor axle 4 into a linear movement of the movement axle 6 and also, a clearance removal means 12 for removing clearance in the axial direction. In FIG. 5 the axial spring means 12 is placed in a recess 9a in the supporting part 9, that is, in the control flange 9. In FIG. 5 the axial spring means 12 is prestressed in the axial direction in such a manner that it is compressed between the supporting frame 9 and a locking piece 40 in the movement axle 6.

It is also essential for this actuator for linear movement that the thread transmission 7 to 8 between the motor axle 4 and the movement axle 6 comprises an internal thread 7 in the motor axle 4 and an external thread 8 in the movement axle. Differing from the first embodiment, the controlling support is based on that the movement axle is a so-called square axle, whereupon the movement axle 6 comprises a quadrangular support 11 and in that case the supporting frame 9 comprises an opening, that is, a recess 10, that is, a space 10 of a corresponding shape.

The second embodiment most preferably comprises a means 30 between the space 10 of the movement axle 6 and the supporting frame 9 for removing vertical, horizontal and rotary clearances. FIG. 6 illustrates this means 30. The means 30 comprises four wings 30a to 30d, that is, one wing for each surface of the opening 10. The means 30 is thus a clearance removal spring 30 whose wings are compressed against the walls of the square opening 10 removing vertical, horizontal and rotary clearances. The means 30 is most preferably placed against the end of the support 11. The means 30 for removing vertical, horizontal and rotary clearances is placed around the movement axle 6 in the recess 10 of the supporting frame 9. This method of placing is operationally good and well protected, too.

Although the invention has been explained above with reference to the examples of the appended drawings, it is evident that the invention is not restricted to them, but it may be modified in many ways within the inventive idea disclosed in the attached claims.

What is claimed is:
1. An actuator for linear movement comprising:
motor provided with a rotatable motor axle;
a movement axle;
a thread transmission between the motor axle and the movement axle;
a supporting frame;
a controlling support between the supporting frame and the movement axle for changing rotating movement of the motor axle into a linear movement of the movement axle;
wherein the thread transmission includes an internal thread in the motor axle, and an external thread in the movement axle;
a means for removing clearance in an axial direction,
a means for removing vertical, horizontal and rotary clearances.
2. An actuator for linear movement according to claim 1, wherein the means for removing vertical, horizontal and rotary clearances is a clearance removal means prestressed in the direction of rotation.
3. An actuator for linear movement according to claim 2, wherein the means for removing vertical, horizontal and rotary clearances is arranged to rotate projections on the movement axle against recesses in the supporting frame.
4. An actuator for linear movement according to claim 2, wherein the means for removing clearance prestressed in the axial direction and in the direction of rotation is a coil spring.
5. An actuator for linear movement according to claim 2, further comprising adjusting means for prestressing the clearance removal means in the direction of rotation into desired prestressing.
6. An actuator for linear movement according to claim 5, wherein the controlling support comprises several projections on the movement axle, the projections extending away from a middle line of the movement axle, the middle line extending in an axial direction and that as counterparts for the projections, the controlling support comprises recesses formed to the supporting frame, the recesses similarly extending away from the middle line of the movement axle.
7. An actuator for linear movement according to claim 6, wherein the adjusting means for prestressing the clearance removal means in the direction of rotation into desired prestressing are projections on the movement axle and recesses in the controlling support.
8. An actuator for linear movement according to claim 6, wherein the projections on the movement axle are non-magnetic material.
9. An actuator for linear movement according to claim 5, wherein the recesses the movement axle and also, the recesses in the supporting frame are situated symmetrically around the movement axle.
10. An actuator for linear movement according to claim 1, wherein the means for removing vertical, horizontal and rotary clearances is a clearance removal means which is used for removing clearance in the axial direction and which is also prestressed in the direction of rotation.
11. An actuator for linear movement according to claim 1, wherein the clearance removal means is at least primarily within the area confined by the supporting frame (9).
12. An actuator for linear movement according to claim 1, wherein the actuator, in which the thread transmission between the motor axle and the movement axle forms a first supporting surface of the movement axle and the controlling support between the supporting frame and the movement axle forms a second supporting surface, the supporting surfaces, when viewed in the axial direction, are clearly at a distance from one another in such a manner that the first supporting surface is in the area inside the motor and the second supporting surface is in the area outside the motor.

13. An actuator for linear movement according to claim 1, wherein the means for removing vertical, horizontal and rotary clearances is between the movement axle and the supporting frame.

14. An actuator for linear movement according to claim 1, wherein the means for removing vertical, horizontal and rotary clearances comprises several flexible wings.

15. An actuator for linear movement according to claim 1, wherein the means for removing vertical, horizontal and rotary clearances is placed around the movement axle in a space of the supporting frame.

16. An actuator for linear movement according to claim 1, wherein the actuator for linear movement is an actuator for linear movement used in a high frequency filter for moving a frequency control element.

* * * * *